United States Patent

[11] 3,577,091

[72] Inventors Francis Rachal
Baltimore;
Donald B. McKone, Glen Burnie, Md.
[21] Appl. No. 827,553
[22] Filed May 26, 1969
[45] Patented May 4, 1971
[73] Assignee The United States of America as represented by the Secretary of the Air Force

[54] REMOTE CONTROLLED MONITOR CIRCUIT

2 Claims, 3 Drawing Figs.

[52] U.S. Cl. .......... 330/24, 330/3, 330/30D, 330/35
[51] Int. Cl. .......... H03f 3/16, H03f 3/8
[50] Field of Search .......... 330/3, 30 (D), 38 (FE), 24

[56] References Cited
UNITED STATES PATENTS
3,440,525 4/1969 Cardeiro .......... 324/30

*Primary Examiner*—Nathan Kaufman
*Attorneys*—Harry A. Herbert, Jr. and George Fine

ABSTRACT: An electronically operated remotely controlled circuit. The circuit provides desired logarithmic volume control from a single linear potentiometer, on-off gating, low noise and distortion, all from a differential-type integrated circuit.

INVENTORS
FRANCIS RACHAL
DONALD B. McKONE
BY Harry A. Herbert Jr.
and
George Fine
ATTORNEYS INVENTORS
FRANCIS RACHAL
DONALD B. McKONE
BY Harry A. Herbert Jr and
George Fine

REMOTE CONTROLLED MONITOR CIRCUIT

BACKGROUND OF THE INVENTION

The invention relates to a remote controlled monitor circuit and more particularly an electronically operated, remotely controlled balanced-type monitoring network.

Remotely controlled monitoring (volume control and on-off signal gating) circuits have in the past consistently posed design problems. These problems were one or more of the following: multi control-lines for volume control and gating functions which yield high weight and wiring complexity, large-signal distortion, necessity of exotic control devices to obtain the desired volume control taper (signal power out as a function of control rotation angle ($\theta$)), and circuits not suitable for microminiaturization (integrated circuit construction).

Remote monitoring circuits were designed such that volume control and on-off circuit gating required individual control lines. Individual control lines were required because the volume control function did not complement the on-off function in the same circuit. The volume control function usually has been derived by either adjusting the resistance of a potentiometer (two long control lines) which in turn adjusts the gain of a remote amplifier, adjusting the voltage to a servo motor (at amplifier location) which in turn drives a potentiometer to change the gain of an amplifier, or adjusting the DC bias of a diode or a transistor which in turn changes the dynamic loading of an amplifier.

On-off circuit gating has usually been obtained by either utilizing switching transistors or relays to switch either $B^+$ or ground.

These monitoring circuits, in addition to possessing the disadvantage of requiring multi control-lines, possess the following volume control disadvantages. The potentiometer controlled amplifier is typically a noisy circuit because any pickup on the required two long lines from the potentiometer to the remote amplifier is added as noise (interference) to the output signal. In addition, the taper of the control potentiometer has to be complex, typically logarithmic, to yield the desired volume control taper (Pout vs $\theta$ of pot. Shaft). The servo-controlled amplifier (used in precision volume control circuits) requires a servo motor, a potentiometer, and an amplifier as the remote monitoring circuit. This circuit is not suitable for use in systems where micorminaturization (integrated circuit fabrication) of the entire remote amplifier is desired. The diode or transistor controlled amplifier is a high distortion device because a diode or a transistor (below knee of characteristics) does not possess a linear control characteristic and therefore does not have a linear segment suitable for the dynamic range normally required in volume-controlled circuits. In addition, decoupling capacitors which are not suitable for fabrication in monolithic form for microminiaturization are required, and a specially designed control potentiometer may be required to obtain the desired volume control taper.

SUMMARY OF THE INVENTION

The present invention is an electronically operated, remotely controlled, balanced type monitoring network. The salient features of this network are: it requires only a single control line, it provides the desired volume control taper (signal power out as a function of control shaft rotation angle) and on-off gating using a simple linear taper potentiometer, it is constructed from integrated circuit devices; construction is from an integrated circuit (IC) differential amplifier (including gating transistor device) and a field-effect transistor (FET) device, and it provides operation over a large volume control range with little or no signal distortion.

The feature of requiring only one control line to the remote monitoring amplifier represents (in terms of interconnection cabling) an economic, weight, and space advantage over currently used networks. In a complex system such as found on many aircraft, where many channels are to be monitored, the reduction of the number of control lines by one-half would permit the use of a cable with one-half the number of control conductors. A cable with a significantly fewer number of conductors will cost less and will be much smaller and lighter.

The feature of obtaining the desired volume control taper and on-off gating control with a simple, linear tapered potentiometer as the control potentiometer also represents an economic advantage over currently used networks. Linear-tapered potentiometers of several shapes, tolerances, and wattage ratings are readily available as off-the-shelf items at a cost that is much more economical than potentiometers with complex tapers. Therefore, it is not necessary to design, develop, and manufacture a one-of-a-kind exotic control potentiometer such as might be needed with a diode or transistor-controlled network.

The feature of network construction from integrated circuit devices represents advantages of size, weight, reliability, and low power consumption. These can be extremely important in an application such as an aircraft where size, weight and available power is a premium.

The feature of little or no distortion over a wide control range results from combining a symmetrical FET with a balanced differential amplifier of special design. The differential amplifier provides high common-mode rejection and symmetrical characteristics of the FET provides a low distortion volume control. The low distortion results from the very linear characteristic (for a given gate to source bias) of the FET over the dynamic range necessary for this volume control network. The wide control range results from the wide range of effective drain-to-source resistance of a FET which is controlled by the gate-to-source bias voltage. Furthermore, only a voltage (no power) is required from the control device because the gate current is essentially zero.

An object of the present invention is to provide an electronically operated, remotely controlled monitoring circuit.

The various features of novelty which characterize this invention are pointed out with particularity in the claims annexed to and forming part of this specification. For a better understanding of the invention, however, its advantage and specific objects obtained with its use, reference should be had to the accompanying drawings and descriptive matter in which is illustrated and described a preferred embodiment of the invention.

DESCRIPTION OF THE PREFERRED EMBODIMENT

Figure 1:
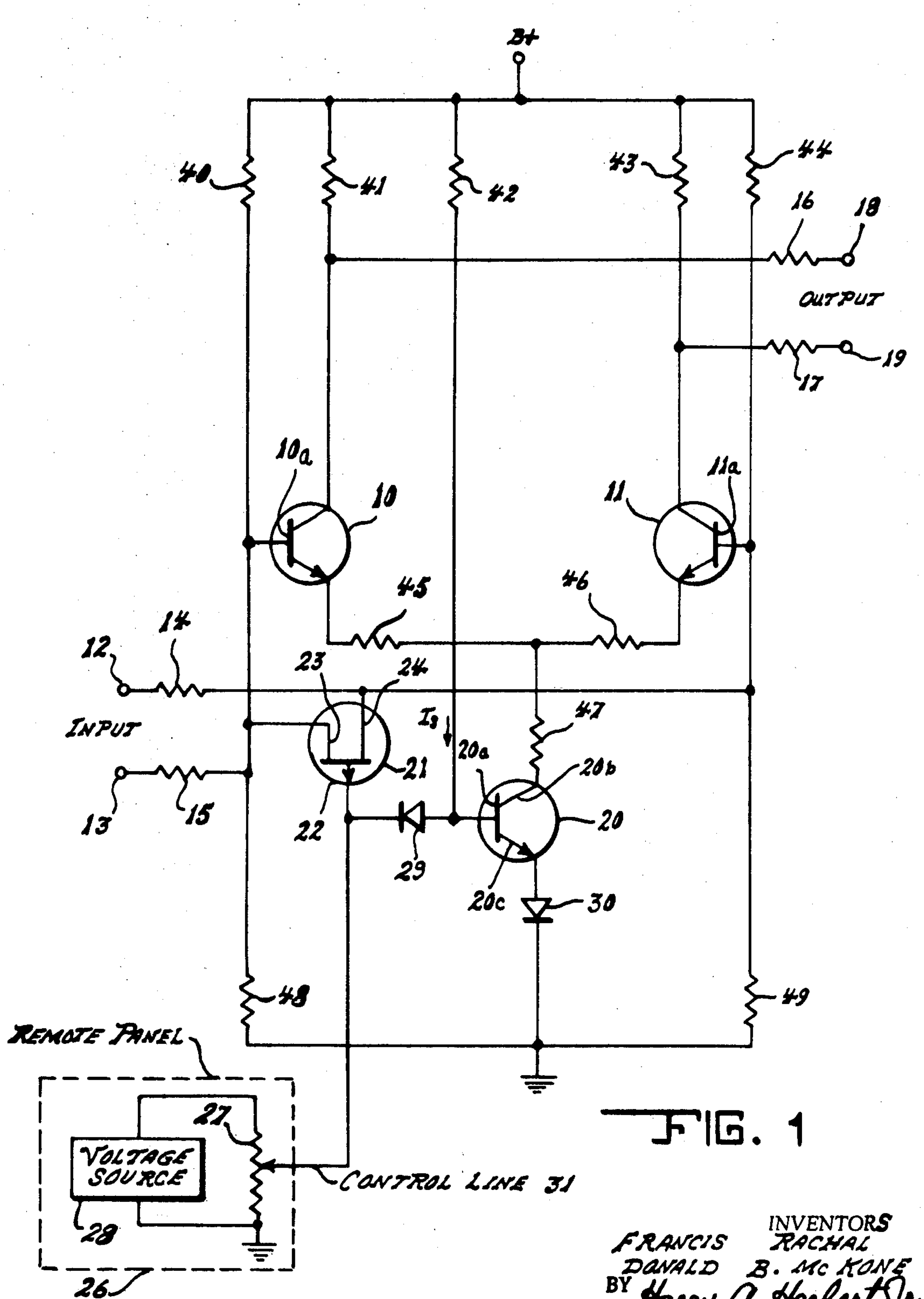
FIG. 1 shows a schematic diagram of the electronically operated, remotely controlled monitoring circuit of the invention.

Now referring to FIG. 1 showing the electronically operated, remotely controlled monitoring circuit and it is comprised of a balanced, class A differential amplifier employing transistors 10 and 11 with input isolation of resistors 14 and 15 and output isolation resistors 16 and 17, a gating circuit employing transistor 20, and a $p$-channel FET (field effect transistor) 21.

Figure 2:
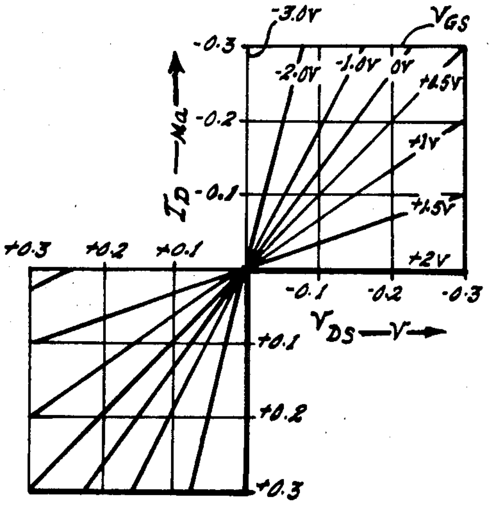
FIG. 2 is a representation of the low-level bidirectional output characteristic of a field effect transistor device such as a 2N2608.

Remote volume control is achieved by applying a DC control voltage from a remote control panel to gate 22 of FET 21 whose drain 23 and source 24 are connected directly to bases 10*a* and 11*a* of amplifying transistors 10 and 11, respectively. In this application FET 21 is used as a voltage-controlled variable resistor (see typical characteristic shown in FIG. 2) to control the gain of the amplifier by controlling the dynamic load at the input. Since the FET exhibits a logarithmic relationship between the resistance drain-to-source, $R_{ds}$, and the voltage gate to source, $V_{GS}$ ($\log R_{ds}=AV_{GS}$), the effect of using a logarithmic tapered potentiometer ($\log R=K\theta$) is achieved by using a simple linear-tapered potentiometer to supply voltage to the FET (i.e., $V_{GS}=K\theta$ pot, $\therefore$ log $R_{ds}=K\theta$). Linear-tapered potentiometer 27 is shown located at remote panel 26. Potentiometer 27 is shown connected to voltage source 28. The control voltage range necessary when using the FET whose characteristics are shown in FIG. 2 is +6 to +1 volts; since the base level is at +4 volts in this particular circuit. The output signal level works in the same direction as the control voltage (i.e., full volume at high voltage and low volume at low control voltage).

Figure 3:
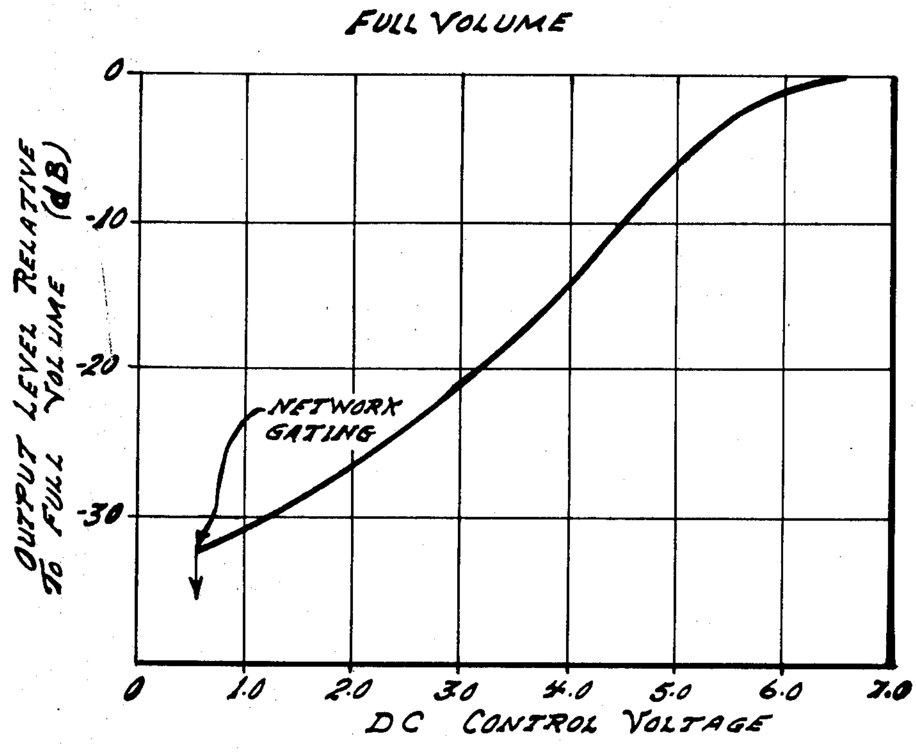
FIG. 3 illustrates volume control characteristics.

On-off gating of the circuit is accomplished by using transistor 20 to switch transistors 10 and 11 of the differential amplifier on or off. Since the forward diode voltage of diodes 29 and 30 are the same, when control line 31 is set at any level above the forward voltage of the base to emitter diode of transistor 20 (voltage anywhere in control range of the FET), diode 29 is nonconducting and transistor 20 is saturated by the current $I_s$. In the saturated condition, transistor 20 acts like a short circuit (very low impedance) to ground allowing the amplifier to pass any input signal from terminals 12, 13. When the control voltage from potentiometer 27 is set at any level below the forward voltage of the base-to-emitter diode (lower limit of FET control range), diode 29 is snapped in and transistor 20 is cut off because the saturating current, $I_s$, flows through diode 29 and not into the base of transistor 20 (see gating point in FIG. 3). In the cutoff condition, no current (collector or emitter) of the amplifier stage can flow in the amplifier; therefore, the emitters of the amplifier stage assume the supply voltage, and the base-to-emitter junctions of both amplifying transistors are reverse biased causing the amplifier to block any input signal. Resistors 40—49 are utilized to provide operating voltages.

Input isolation, reducing the effects of gating on or off the differential amplifier from the input lines, for multiple circuit operation (drive) by one input signal is achieved by using decoupling resistors in the bases of both amplifier transistors. These resistors create a high input impedance that is insensitive to amplifier gating. High output isolation, reducing the effects of amplifier gating from the output lines, can be achieved in the same manner as input isolation if summing is necessary.

In the operation of an experimental monitoring circuit designed to provide 6 mV. RMS into a 150 ohm load with a 2 volt RMS input using 25 k ohm isolation resistors and a Type 2N2608 FET operating from a 17 volt supply yielded the volume control curve shown in FIG. 3. The volume control range was approximately 30 db. with a maximum distortion of 3 percent, the feed through signal when amplifier was gated off was more than 60 db. down from full volume level, and the frequency response was essentially flat from 100 Hz. to 10 kHz. The circuit required 4 ma. of current from the 17 volt supply

We claim:

1. An electronically operated remote controlled monitoring circuit comprising a DC voltage source, a linear tapered potentiometer connected to said DC voltage source to provide a variable DC control voltage, a field-effect transistor, having gate, drain, and source and operating as a voltage controlled variable resistor, said field-effect transistor being at a position remote from the combination of said DC voltage source and said linear tapered potentiometer, a single control line interconnecting said combination and said gate of said field-effect transistor to provide said variable DC control voltage thereto, a first and second transistor interconnected to provide a differential amplifier, each of said first and second transistors having an input and each receiving an input signal, said source and said drain of said field-effect transistor being connected to said inputs of said first and second transistor, respectively, and operating to control the gain of said differential amplifier by variation of said DC control voltage, and means to switch said differential amplifier on and off, said switching means being connected to said combination of said DC voltage source and said linear tapered potentiometer by way of said single control line to provide input switching signals thereto, said switching means also being connected between said differential amplifier and ground with said switch means operating at one preselected level of said switching signal to gate on said differential amplifier by connecting said differential amplifier to ground and further operating at a second preselected level of said switching signal to gate off said differential amplifier by disconnecting said differential amplifier from said ground.

2. An electronically operated remote controlled monitoring circuit as described in claim 1 wherein each of said inputs of said differential amplifier include isolation resistors.